(12) United States Patent
Jin et al.

(10) Patent No.: US 12,388,531 B2
(45) Date of Patent: Aug. 12, 2025

(54) OPTICAL TRANSMISSION DEVICE BASED ON LITHIUM NIOBATE MODULATION METHOD

(71) Applicant: Global Technology Inc., Ningbo (CN)

(72) Inventors: Hao Jin, Ningbo (CN); Fan Yang, Ningbo (CN); Qikun Huang, Ningbo (CN)

(73) Assignee: Global Technology Inc., Ningbo (CN)

( * ) Notice: Subject to any disclaimer, the term of this patent is extended or adjusted under 35 U.S.C. 154(b) by 284 days.

(21) Appl. No.: 18/122,313

(22) Filed: Mar. 16, 2023

(65) Prior Publication Data

US 2024/0171283 A1   May 23, 2024

(30) Foreign Application Priority Data

Nov. 18, 2022   (CN) .......................... 202211443944.7

(51) Int. Cl.
*H04B 10/50* (2013.01)
*G02F 1/035* (2006.01)

(52) U.S. Cl.
CPC ......... *H04B 10/503* (2013.01); *G02F 1/0356* (2013.01); *G02F 2202/20* (2013.01)

(58) Field of Classification Search
CPC ............................ H04B 10/503; G02F 1/0356
USPC ......................................................... 398/183
See application file for complete search history.

(56) References Cited

U.S. PATENT DOCUMENTS

| | | | | |
|---|---|---|---|---|
| 9,244,327 | B2 * | 1/2016 | Prosyk | G02F 1/225 |
| 2002/0089733 | A1 * | 7/2002 | Gopalakrishnan | H04B 10/505 |
| | | | | 359/254 |
| 2023/0375893 | A1 * | 11/2023 | Kurahashi | G02F 1/212 |
| 2024/0171278 | A1 * | 5/2024 | Jin | H04B 10/25753 |
| 2024/0210784 | A1 * | 6/2024 | Hayami | G02F 1/212 |

FOREIGN PATENT DOCUMENTS

| | | | | |
|---|---|---|---|---|
| CN | 118057747 A | * | 5/2024 | ......... H04B 10/2575 |
| WO | WO-2019218385 A1 | * | 11/2019 | ........... G02F 1/0316 |
| WO | WO-2022225559 A1 | * | 10/2022 | ........... G02F 1/2255 |

* cited by examiner

*Primary Examiner* — Amritbir K Sandhu
(74) *Attorney, Agent, or Firm* — Grossman Tucker Perreault & Pfleger, PLLC

(57) ABSTRACT

An optical transmission device comprises a lithium niobate modulator and a laser. The lithium niobate modulator includes an input optical fiber configured to receive the initial optical signal, an optical splitting element configured to split the initial optical signal to generate two optical splitting signals, two optical splitting paths configured to transmit the two optical splitting signals, a radio-frequency signal channel disposed in parallel between the two optical splitting paths and configured to transmit a radio-frequency modulation signal, a ground channel disposed in parallel with and connected to the radio-frequency signal channel, an optical combining element configured to combine the two optical splitting signals to generate an optical modulation signal, and a output optical fiber configured to output the optical modulation signal. The radio-frequency signal channel and the ground channel are used in modulation of the two optical splitting signals in accordance with the radio-frequency modulation signal.

7 Claims, 2 Drawing Sheets

OPTICAL TRANSMISSION DEVICE BASED ON LITHIUM NIOBATE MODULATION METHOD

CROSS-REFERENCE TO RELATED APPLICATIONS

This non-provisional application claims priority under 35 U.S.C. § 119(a) on Patent Application No(s). 202211443944.7 filed in China on Nov. 18, 2022, the entire contents of which are hereby incorporated by reference.

BACKGROUND

1. Technical Field

This disclosure relates to a transmission technique of radio over fiber (ROF), particularly relates to an optical transmission device based on lithium niobate modulation method, which can be used in 5G communication system.

2. Related Art

One significant characteristic of the electromagnetic wave is that, with higher frequency and shorter wavelength, its propagation path is more likely to approach a straight line, which means that its diffraction ability is lowered. The higher the frequency, the greater the attenuation is in the propagation medium.

5G network, particularly of a high-frequency band above 250 GHz, is supposed to require much higher number of base stations than its 4G counterpart to cover the same area thanks to its shorter propagation distance and lesser signal coverage characteristics.

Distributed antenna system (DAS) is a mobile communication network constructed by a plurality of antenna nodes connected to various signal sources through various signal communication media and distributed inside a space or an architecture. DAS is used in a facility with many users, with the remote antenna unit of high density and low power requirement.

SUMMARY

Accordingly, this disclosure provides an optical transmission device based on lithium niobate modulation method.

According to one or more embodiments of this disclosure, an optical transmission device based on lithium niobate modulation method comprises a lithium niobate modulator and a laser configured to generate an initial optical signal. The lithium niobate modulator includes an input optical fiber configured to receive the initial optical signal, a first optical splitting element configured to split at least a part of the initial optical signal to generate two first optical splitting signals, two first optical splitting paths configured to transmit the two first optical splitting signals, a first radio-frequency signal channel disposed in parallel between the two first optical splitting paths and configured to transmit a first radio-frequency modulation signal, a first ground channel disposed in parallel with the first radio-frequency signal channel and connected to the first radio-frequency signal channel and configured to be grounded, a first optical combining element configured to combine the two first optical splitting signals to generate a first optical modulation signal, and a first output optical fiber configured to output the first optical modulation signal. The first radio-frequency signal channel and the first ground channel are used in modulation of the two first optical splitting signals in accordance with the first radio-frequency modulation signal.

In view of the above description, the optical transmission device based on lithium niobate modulation method of the present disclosure provides an optical transmission device with lithium niobate modulator, and the optical transmission device is configured to modulate the optical signal with the radio-frequency signal through optical fiber. Except for the input optical fiber and the output optical fiber, the lithium niobate modulator also includes the radio-frequency signal channel and the ground channel so that the optical splitting signal from the input optical fiber and generated by the optical splitting element can be modulated by the radio-frequency modulation signal. In this way, an optical transmission device with low power consumption, small size, high performance, simple organization, and the capability of transmitting signals with a base station can be achieved. In addition, the optical transmission device of the present disclosure can be implemented as a form of one-receive-one-transmit (1T1R) or multiple-receive-multiple-transmit (2T2R or more), and the flexibility of application is expanded.

The above descriptions of the content of this disclosure and the following illustrations about the embodiments serve to demonstrate and explain the spirit and the principle of the present invention, and to provide further explanations to the claims of the present invention.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein:

FIG. 1 schematically illustrates an optical transmission device based on lithium niobate modulation method according to an embodiment of the present disclosure; and.

DETAILED DESCRIPTION

Figure 1:
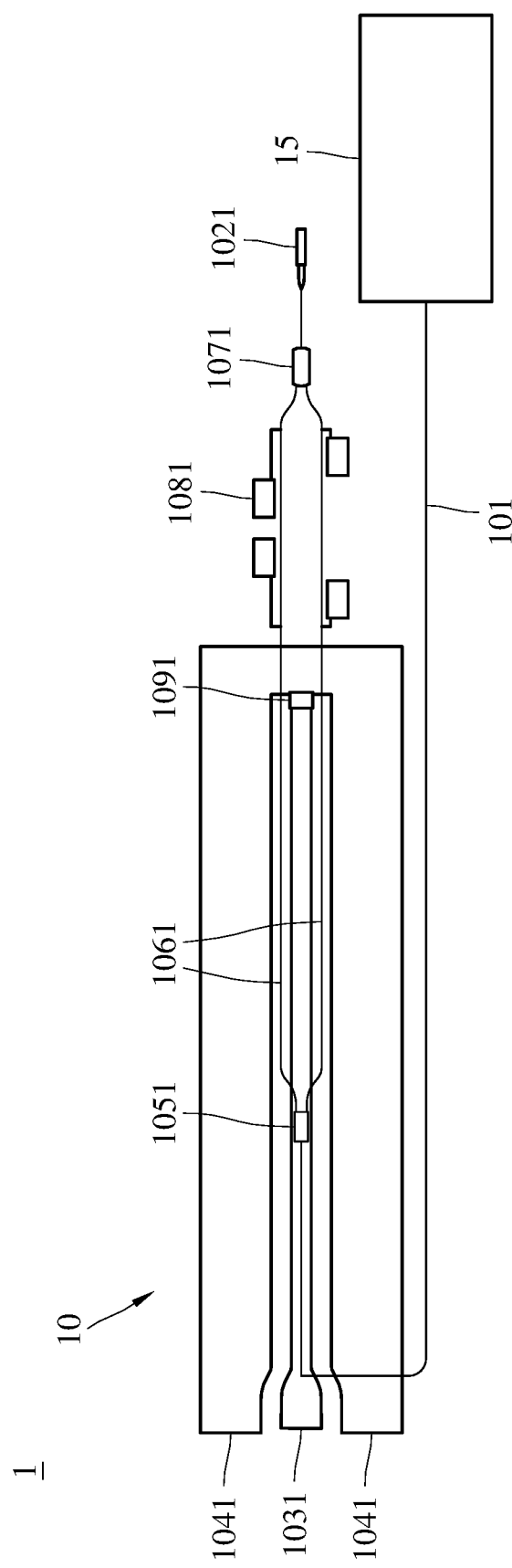

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

In the following descriptions, the term "first element" or "first signal" may indicate that there is only one element and one signal, or may indicate that there are other elements and signals in the present disclosure. Similar terms should refer to similar elements unless otherwise indicated. For example, "element" can generally include "first element" and "second element", and "first element" may be similar to "second element".

The optical transmission device based on lithium niobate modulation method according to an embodiment of the present disclosure may be applied to the optical communication or the distributed antenna system (DAS) and can provide an optical transmission device capable of modulating the optical signal transmitted in the optical fiber through the radio-frequency signal. The optical transmission device of the present disclosure may be configured to transmit and receive signal for the base station under/on the tower, and may also be configured to transmit and receive signal of the optical transmission sub-module (such as a transmitter optical subassembly, TOSA) at the outdoor/indoor antenna end.

In the following descriptions, an optical signal generally refers to an electromagnetic wave signal transmitted through an optical fiber as media. The optical signal has advantages of lower energy loss and higher signal density and may be transmitted in the form of pulse or continuous wave. In the following embodiments, the optical signal may be generated by a coherent source such as a laser or a laser diode, and the radio-frequency signal may be an electrical signal generated by the antenna after receiving a radio signal, wherein the radio-frequency signal may be an analog signal or a digital signal.

According to the optical transmission device based on lithium niobate modulation method of the present disclosure, the information of the radio-frequency signal can be modulated into the optical signal so that the optical signal may carry the information of the radio-frequency signal. Therefore, the optical signal with the information of the radio-frequency signal can be efficiently and securely transmitted through the optical fiber, and the optical signal may also be converted into an electrical signal through another electro-optic modulator (EOM) for subsequent process. Generally speaking, the modulation can be categorized into digital modulation and analog modulation based on whether the modulation signal belongs to a digital signal or analog signal, with the modulation method including amplitude modulation (AM), frequency modulation (FM), phase modulation (PM), quadrature amplitude modulation (QAM), pulse width modulation (PWM), or the like. Different modulation methods may be applied with the same modulation effect. For example, the phase modulation method can be applied to generate constructive interference with the effect of amplitude modulation. Thus, the scope of the present disclosure is not limited to various modulation methods.

The optical transmission device based on lithium niobate modulation method will be described in the following descriptions. Please refer to FIG. 1 which schematically illustrates an optical transmission device based on lithium niobate modulation method according to an embodiment of the present disclosure. An optical transmission device 1 might include a lithium niobate modulator 10 and a laser 15 for generating an initial optical signal. The lithium niobate modulator 10 includes an input optical fiber 101, a first optical splitting element 1051, two first optical splitting paths 1061, a first radio-frequency signal channel 1031, two first ground channels 1041, a first optical combining element 1071 and a first output optical fiber 1021. The first optical splitting element 1051 is configured to receive the initial optical signal. The first optical splitting element 1051 is configured to split at least part of the initial optical signal to generate two first optical splitting signals. The two first optical splitting paths 1061 are configured to transmit the two first optical splitting signals. The first radio-frequency signal channel 1031 is disposed in parallel between the two first optical splitting paths 1061 and configured to transmit a first radio-frequency modulation signal. The two first ground channels 1041 are disposed in parallel with the first radio-frequency signal channel 1031 and connected to the first radio-frequency signal channel 1031. The first optical combining element 1071 is configured to combine the two first optical splitting signals to generate a first optical modulation signal. The first output optical fiber 1021 is configured to output the first optical modulation signal. The first radio-frequency signal channel 1031 and the two first ground channels 1041 are used in modulation of the two first optical splitting signals in accordance with the first radio-frequency modulation signal.

In the present embodiment, as shown in FIG. 1, the initial optical signal is provided by the laser 15 which could be a laser diode. The wavelength of the electromagnetic wave of the initial optical signal may be within infrared, visible light, ultraviolet light, or other wavelength ranges, and the initial optical signal may be an electromagnetic pulse or continuous wave. The initial optical signal emitted by the laser 15 can be coupled into the input optical fiber 101 through focusing by lens (not shown). In the present embodiment, the input optical fiber 101 is at least connected to one first optical splitting element 1051. In another embodiment, the input optical fiber 101 may be selectively connected to the front-end optical splitting element, and the optical signal may be modulated through a plurality of radio-frequency input signals, which will be described in the following descriptions.

In the present embodiment, the initial optical signal is split into two first optical splitting signals by the first optical splitting element 1051, and the two first optical splitting signals are transmitted through the two first optical splitting paths 1061. In the lithium niobate modulator 10, the first radio-frequency signal channel 1031 disposed in parallel between the two first optical splitting paths 1061 may receive the radio-frequency modulation signal. The first radio-frequency signal channel 1031 is connected to the first ground channels 1041 located on both sides of the first radio-frequency signal channel 1031. And there is a long and narrow gap with a certain width between the ground channels 1041 and the radio-frequency signal channel 1031. Therefore, the electrical potential difference between both sides of the gap results in a distribution of an electrical field, thereby modulating the first optical splitting signal in the first optical splitting path 1061. In addition, a first terminal resistor 1091 may be disposed between the first radio-frequency signal channel 1031 and the first ground channel 1041 as a load of the radio-frequency signal channel. More specifically, the first terminal resistor 1091 may be connected to the first radio-frequency signal channel 1031 and the first ground channel 1041.

In the present embodiment, the lithium niobate modulator 10 may further include a first hot electrode 1081 for a voltage to be applied to the first optical splitting path to additionally modulate the first optical splitting signal (such as the phase of the optical signal). After the modulation described above, the two first optical splitting signals may be combined through the first optical combining element 1071 before a first optical modulation signal could be generated and outputted through the first output optical fiber 1021. Accordingly, the present embodiment with a single-arm lithium niobate modulation scheme may be designed as a one-receive-one-transmit (1T1R) optical module for signal transmission between base stations. Compared with an ordinary remote antenna unit (RAU), the optical transmission device of the present disclosure uses the ROF technique to improve the modulation linearity and the bandwidth, lowers the size and power consumption, and reduces the construction complexity. Further compared with the ordinary ROF optical module, the optical transmission device of the present disclosure realizes modulating and transmitting with one or multiple channels of radio-frequency signal.

Figure 2:
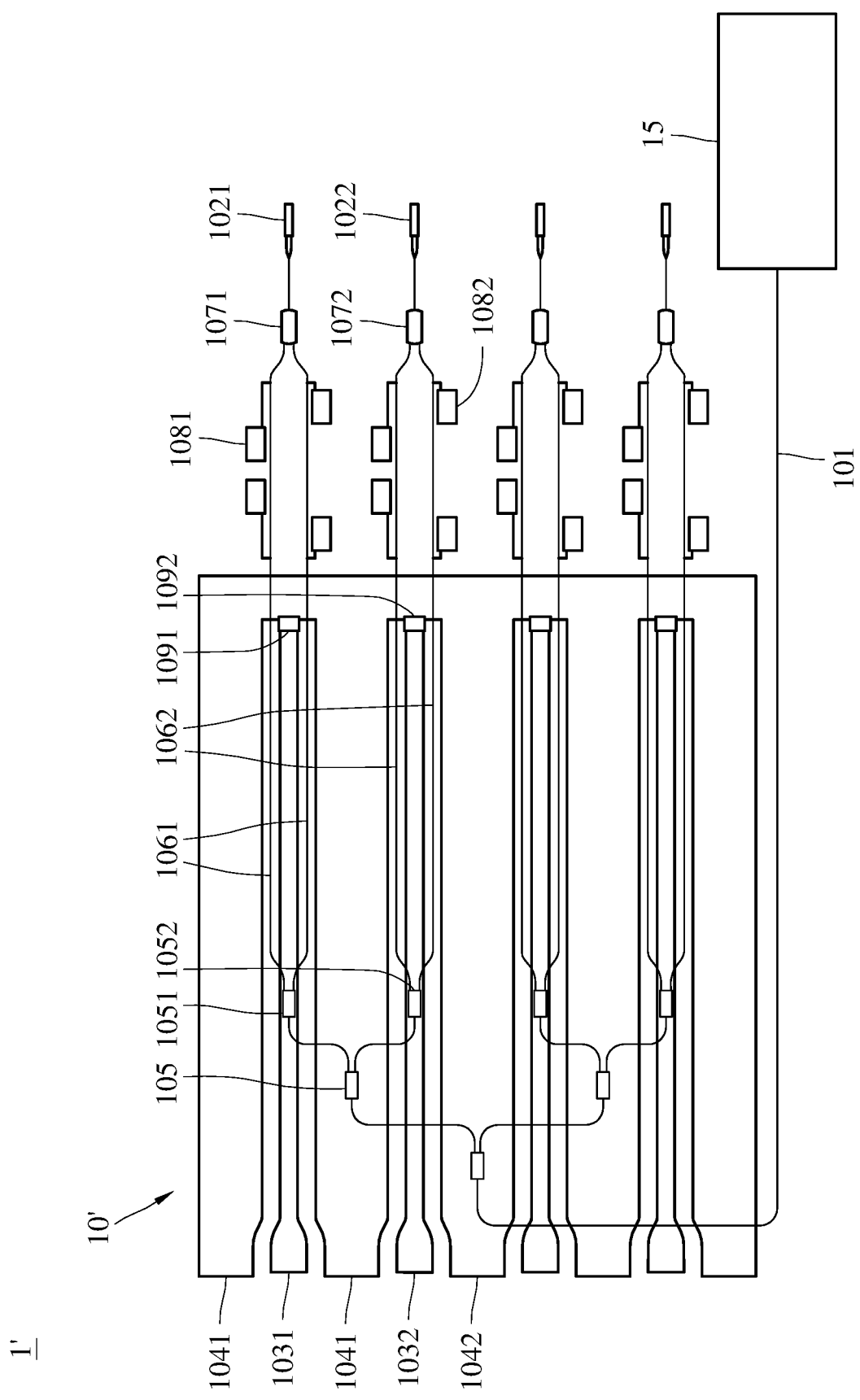
FIG. 2 schematically illustrates an optical transmission device based on lithium niobate modulation method according to another embodiment of the present disclosure.

In conjunction with FIG. 1, please refer to FIG. 2 which schematically illustrates an optical transmission device based on lithium niobate modulation method according to another embodiment of the present disclosure. In the present embodiment, the lithium niobate modulator 10' of the optical transmission device 1' may include a plurality of output optical fibers and a plurality of radio-frequency signal channels which can be used in multiple-arm modulation. In the present embodiment, the second output optical fiber 1022 and its associated components based on the second radio-frequency signal channel 1032 are further illustrated in addition to the first output optical fiber 1021 and its associated components based on the first radio-frequency signal channel 1031 described above. Therefore, other embodiments with more output optical fibers based on additional radio-frequency signal channels may be achieved through simple modification over the present embodiment. In the present embodiment, the lithium niobate modulator 10' may further include a second optical splitting element 1052, a front-end optical splitting element 105, two second optical splitting paths 1062, a second radio-frequency signal channel 1032, a second ground channel 1042, a second optical combining element 1072, and a second output optical fiber 1022. The second optical splitting element 1052 is connected to the input optical fiber 101. The front-end optical splitting element 105 is disposed between the input optical fiber 101, the first optical splitting element 1051 and the second optical splitting element 1052, and is connected to the input optical fiber 101. The two second optical splitting paths 1062 are connected to the second optical splitting element 1052. The second radio-frequency signal channel 1032 is disposed in parallel between the two second optical splitting paths 1062. The second ground channel 1042 is disposed in parallel with and connected to the second radio-frequency signal channel 1032. The second optical combining element 1072 is connected to the two second optical splitting paths 1062. The second output optical fiber 1022 is connected to the second optical combining element 1072. The front-end optical splitting element 105 is configured to split the initial optical signal into several parts. Specifically, the first optical splitting element 1051 splits a part of the initial optical signal, and the second optical splitting element 1052 splits another part of the initial optical signal. Other optical splitting elements connected between the front-end optical splitting element and the optical splitting path might be subject to the same arrangement. The second radio-frequency signal channel 1032, the second ground channel 1042, the second optical splitting path 1062, the second optical combining element 1072, the second hot electrode 1082, and the second terminal resistor 1092 are substantially the same as the first radio-frequency signal channel 1031, the first ground channel 1041, the first optical splitting path 1061, the first optical combining element 1071, the first hot electrode 1081, and the first terminal resistor 1091, respectively, in terms of the functionality. Similarly, the second radio-frequency signal channel 1032, the second ground channel 1042, the second optical splitting path 1062, and the second optical combining element 1072 along with one of the first ground channel 1041 (the one which is closer to the second optical splitting path 1062) may be used in preparation of the second optical splitting signal, which might be further modulated using the second radio-frequency modulation signal for the generation of the second optical modulation signal.

In the present embodiment, the second hot electrode 1082 and the second terminal resistor 1092 are similarly disposed as the previous embodiment. Note that the first radio-frequency signal channel 1031 and the second radio-frequency signal channel 1032 may receive a first radio-frequency modulation signal and a second radio-frequency modulation signal independent with each other, for the modulation of two optical splitting signals, respectively. With the first radio-frequency modulation signal and the second radio-frequency modulation signal being provided to the first radio-frequency signal channel 1031 and the second radio-frequency signal channel 1032, respectively, the two optical modulation signals could differ from each other. Through the above configuration, the efficiency of space utilization can be improved. In addition, although there is one second ground channel 1042 in the present embodiment, there may be two second ground channels in another embodiment. In other words, the staggering configuration (GSGSG) of ground channels (G) and radio-frequency modulation signal channels (S) may be substituted as GSGGSG. In this embodiment, the second radio-frequency signal channel is disposed in parallel with the two second ground channels and connected to the two second ground channels. The second radio-frequency signal channel and the two second ground channels are used in the modulation of the second optical splitting signal in accordance with the second radio-frequency modulation signal. It should be understood that, if there are four radio-frequency signal channels in another embodiment, the number of the ground channels could be five (for example, with a configuration of GSGSGSGSG), eight (for example, with a configuration of GSGGSGGSGGSG), or the like, so that the radio-frequency signal channel and the ground channel could be used in the modulation of the signal passing through the optical splitting path with the second radio-frequency modulation signal. In other words, the second radio-frequency signal channel along with the first ground channel and the second ground channel may be used in the modulation of the signal in the optical splitting path. In another implementation, the second radio-frequency signal channel along with the two second ground channels might be used in the modulation of the signal in the optical splitting path.

Accordingly, the present disclosure provides the optical transmission device capable of generating multiple optical modulation signals independent with each other. Note that, though the number of output optical fibers illustrated in FIG. 1 and FIG. 2 is an even number, protective scope of the present disclosure is not limited as the result. In one implementation, two front-end optical splitting elements 105 with an upstream and downstream relationship can be applied to generate three optical modulation signals in the end. For example, given that the front-end optical splitting element can split the initial optical signal into two parts with 50% of original power, respectively, another front-end optical splitting element can be applied to one of the two parts for splitting purpose, so that the initial optical signal could end up with three parts with 50%, 25%, and 25% of power, respectively.

Further descriptions about the modulation mechanism of the lithium niobate modulator 10 or 10' are included herein. An optical waveguide which might be implemented in terms of the first optical splitting path 1061 of the embodiment and made of lithium niobate crystal may serve as an electro-optics modulator (EOM). EOM might operate on basis of Pockels effect and Kerr effect, which originate from the relevance between the refractive index of material and external electrical field intensity, and an external electrical field is applied (such as the electrical field between the first radio-frequency signal channel 1031 and the first ground channel 1041) for modulating optical signals transmitted through an optical waveguide. The described modulation mechanism should be understood as an illustrative description. Practically, other optical characteristics such as the optical absorption rate may also change in response to the external electrical field, which might change the related mechanism.

The laser 15 of the present embodiment may generate a polarized optical signal such as a linearly polarized optical signal or a circularly polarized optical signal, and the optical splitting element may split the optical signal through the polarization characteristic. In addition, in some embodiments, the optical splitting element (such as a beam splitter) and the optical combining element (such as a beam combiner) could be a same kind of element. Absent limitation to spatial arrangement of the hot electrode and the radio-frequency signal channel, the input and output of the embodiment illustrated in FIG. 1 may be swapped. In other words, there may be a plurality of input optical fibers in the embodiment of the present disclosure.

The optical transmission device 1 of the present embodiment may be encapsulated in a small form factor pluggable (SFP) form or a dual small form factor pluggable (DSFP) form, allowing for the accommodation of the same within the currently existing communication optical network system.

In view of the above description, the optical transmission device based on lithium niobate modulation method of the present disclosure provides an optical transmission device with lithium niobate modulator, and the optical transmission device is configured to modulate the optical signal with the radio-frequency signal through optical fiber. Except for the input optical fiber and the output optical fiber, the lithium niobate modulator also includes the radio-frequency signal channel and the ground channel so that the optical splitting signal from the input optical fiber and generated by the optical splitting element can be modulated by the radio-frequency modulation signal. In this way, an optical transmission device with low power consumption, small size, high performance, simple organization, and the capability of transmitting signals with a base station can be achieved. In addition, the optical transmission device of the present disclosure can be implemented as a form of one-receive-one-transmit (1T1R) or multiple-receive-multiple-transmit (2T2R or more), and the flexibility of application is expanded.

Although the present invention is disclosed in the foregoing embodiments, it is not intended to limit the present invention. Changes and modifications made without departing from the spirit and scope of the present invention belong to the scope of patent protection of the present invention. For the scope defined by the present invention, please refer to the attached claims.

What is claimed is:

1. An optical transmission device based on lithium niobate modulation method, comprising:
   a laser configured to generate an initial optical signal; and
   a lithium niobate modulator comprising:
      an input optical fiber connected to the laser and configured to receive the initial optical signal;
      a first beam splitter connected to the input optical fiber and configured to split at least a part of the initial optical signal to generate two first optical splitting signals;
      two first optical splitting paths connected to the first beam splitter and configured to transmit the two first optical splitting signals;
      a first radio-frequency signal channel disposed in parallel between the two first optical splitting paths and configured to transmit a first radio-frequency modulation signal;
      two first ground channels disposed in parallel with the first radio-frequency signal channel and connected to the first radio-frequency signal channel and configured to be grounded;
      a first beam combiner connected to the two first optical splitting paths and configured to combine the two first optical splitting signals to generate a first optical modulation signal; and
      a first output optical fiber connected to the first beam combiner and configured to output the first optical modulation signal,
   wherein the first radio-frequency signal channel and the two first ground channels are used in modulation of the two first optical splitting signals in accordance with the first radio-frequency modulation signal.

2. The optical transmission device based on lithium niobate modulation method of claim 1, wherein the lithium niobate modulator further comprises a set of hot electrode which is disposed at the two first optical splitting paths and configured to modulate the two first optical splitting signals.

3. The optical transmission device based on lithium niobate modulation method of claim 1, wherein the lithium niobate modulator further comprises a terminal resistor disposed between the first radio-frequency signal channel and the two first ground channels and connected to the first radio-frequency signal channel and the two first ground channels.

4. The optical transmission device based on lithium niobate modulation method of claim 1, wherein the lithium niobate modulator further comprises:
   a second beam splitter connected to the input optical fiber and configured to split another part of the initial optical signal to generate two second optical splitting signals;
   a front-end beam splitter connected between the input optical fiber, the first beam splitter, and the second beam splitter, and connected to the input optical fiber, the first beam splitter, and the second beam splitter;
   two second optical splitting paths connected to the second beam splitter and configured to transmit the two second optical splitting signals;
   a second radio-frequency signal channel disposed in parallel between the two second optical splitting paths and configured to transmit a second radio-frequency modulation signal;
   a second ground channel disposed in parallel with the second radio-frequency signal channel and connected to the second radio-frequency signal channel and configured to be grounded;
   a second beam combiner connected to the two second optical splitting paths and configured to combine the two second optical splitting signals to generate a second optical modulation signal; and
   a second output optical fiber connected to the second beam combiner and configured to output the second optical modulation signal.

5. The optical transmission device based on lithium niobate modulation method of claim 4, wherein the second radio-frequency signal channel, one of the two first ground channels, and the second ground channel are used in modulation of the two second optical splitting signals in accordance with the second radio-frequency modulation signal.

6. The optical transmission device based on lithium niobate modulation method of claim 4, further comprising another second ground channel disposed in parallel with the second radio-frequency signal channel and connected to the second radio-frequency signal channel, wherein the second radio-frequency signal channel and two second ground channels are used in modulation of the two second optical splitting signals in accordance with the second radio-frequency modulation signal.

7. The optical transmission device based on lithium niobate modulation method of claim 1, wherein the optical transmission device is encapsulated in a small form factor pluggable (SFP) form or a dual small form factor pluggable (DSFP) form.

* * * * *